US010633480B2

(12) United States Patent
Okada et al.

(10) Patent No.: US 10,633,480 B2
(45) Date of Patent: Apr. 28, 2020

(54) FLAME-RETARDANT URETHANE RESIN COMPOSITION

(71) Applicant: SEKISUI CHEMICAL CO., LTD., Osaka (JP)

(72) Inventors: Yousuke Okada, Saitama (JP); Kazuhiro Okada, Saitama (JP); Takehiko Ushimi, Saitama (JP); Yasunari Kusaka, Osaka (JP); Toshitaka Yoshitake, Saitama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/513,652

(22) PCT Filed: Sep. 25, 2015

(86) PCT No.: PCT/JP2015/077160
§ 371 (c)(1),
(2) Date: Mar. 23, 2017

(87) PCT Pub. No.: WO2016/047767
PCT Pub. Date: Mar. 31, 2016

(65) Prior Publication Data
US 2017/0298170 A1 Oct. 19, 2017

(30) Foreign Application Priority Data
Sep. 26, 2014 (JP) .................. 2014-197047

(51) Int. Cl.
C08G 18/09 (2006.01)
C08G 18/16 (2006.01)
C08G 18/18 (2006.01)
C08G 18/20 (2006.01)
C08G 18/22 (2006.01)
C08G 18/32 (2006.01)
C08G 18/42 (2006.01)
C08G 18/48 (2006.01)
C08G 18/72 (2006.01)
C08G 18/76 (2006.01)
C08J 9/00 (2006.01)
C08J 9/14 (2006.01)
C08K 3/02 (2006.01)
C08K 3/08 (2006.01)
C08K 3/22 (2006.01)
C08K 5/00 (2006.01)
C08K 7/02 (2006.01)
(Continued)

(52) U.S. Cl.
CPC ........ C08G 18/1875 (2013.01); C08G 18/092 (2013.01); C08G 18/163 (2013.01); C08G 18/1808 (2013.01); C08G 18/2027 (2013.01); C08G 18/2081 (2013.01); C08G 18/225 (2013.01); C08G 18/4208 (2013.01); C08G 18/48 (2013.01); C08G 18/72 (2013.01); C08G 18/7671 (2013.01); C08J 9/0019 (2013.01); C08J 9/0023 (2013.01); C08J 9/0038 (2013.01); C08J 9/0061 (2013.01); C08J 9/0066 (2013.01); C08J 9/145 (2013.01); C08K 3/013 (2018.01); C08K 3/02 (2013.01); C08K 5/005 (2013.01); C08K 7/02 (2013.01); C08G 2101/005 (2013.01); C08G 2101/0025 (2013.01); C08G 2101/0058 (2013.01); C08G 2105/02 (2013.01); C08J 2201/022 (2013.01); C08J 2203/142 (2013.01); C08J 2203/182 (2013.01); C08J 2205/10 (2013.01); C08J 2375/04 (2013.01); C08J 2375/06 (2013.01); C08J 2471/02 (2013.01); C08K 3/016 (2018.01); C08K 3/22 (2013.01); C08K 3/34 (2013.01); C08K 2003/026 (2013.01); C08K 2003/2237 (2013.01); C08K 2201/003 (2013.01); C08K 2201/005 (2013.01)

(58) Field of Classification Search
CPC ...... C08J 9/0038; C08J 9/0023; C08J 9/0033; C08J 9/0061; C08J 9/0066; C08K 3/0033; C08K 3/003; C08K 3/013; C08K 3/016; C08K 3/22; C08K 3/34; C08K 7/02; C08K 2003/2237; C08K 2201/003; C08K 2201/005
See application file for complete search history.

(56) References Cited

U.S. PATENT DOCUMENTS

2005/0124745 A1* 6/2005 Bauer .................. C08L 101/00
524/437
2007/0287785 A1* 12/2007 Ishida ................ C08G 18/4829
524/450
2015/0322195 A1 11/2015 Makida et al.

FOREIGN PATENT DOCUMENTS

AU 199959238 A1 * 12/1998
AU 758313 6/2000
(Continued)

OTHER PUBLICATIONS

Translation of CN102585148A from Schrebier Translations, Inc. Dec. 2018.*
(Continued)

Primary Examiner — Melissa A Rioja
(74) Attorney, Agent, or Firm — Wenderoth, Lind & Ponack, L.L.P.

(57) ABSTRACT

The flame-retardant urethane resin composition contains a polyisocyanate compound, a polyol compound, a trimerization catalyst, a blowing agent, and an additive, wherein the additives include red phosphorus and a filler, and the filler has an aspect ratio of 5 to 50, an average particle diameter of 0.1 µm or larger, but smaller than 15 µm, and a melting point of 750° C. or higher.

7 Claims, 1 Drawing Sheet

(51) Int. Cl.
  *C08K 7/04* (2006.01)
  *C08L 75/04* (2006.01)
  *C08K 3/013* (2018.01)
  *C08G 101/00* (2006.01)
  *C08K 3/34* (2006.01)
  *C08K 3/016* (2018.01)

(56) References Cited

FOREIGN PATENT DOCUMENTS

| CN | 1318532 | 5/2007 |
|---|---|---|
| CN | 102585148 A * | 7/2012 |
| EP | 3 112 388 | 1/2017 |
| EP | 3 112 739 | 1/2017 |
| JP | 8-118527 | 5/1996 |
| JP | 10-251508 | 9/1998 |
| JP | 2008-518084 | 5/2008 |
| JP | 2011-140209 | 7/2011 |
| JP | 2014-205932 | 10/2014 |
| JP | 2015-078594 | 4/2015 |
| JP | 5986693 | 9/2016 |
| WO | 03/066766 | 8/2003 |
| WO | 2006/049863 | 5/2006 |
| WO | 2014/011527 | 1/2014 |
| WO | 2014/112394 | 7/2014 |

OTHER PUBLICATIONS

International Search Report dated Dec. 15, 2015 in International (PCT) Application No. PCT/JP2015/077160.
Notification of Reasons for Refusal dated Dec. 20, 2016 in corresponding Japanese Application No. 2016-096184, with machine translation.
Extended European Search Report dated Mar. 27, 2018 in European Application No. 15843303.7.
Liu, Boyuan, "China Non-Metallic Minerals Exploitation and Utilization", 2003, pp. 156-161.

* cited by examiner

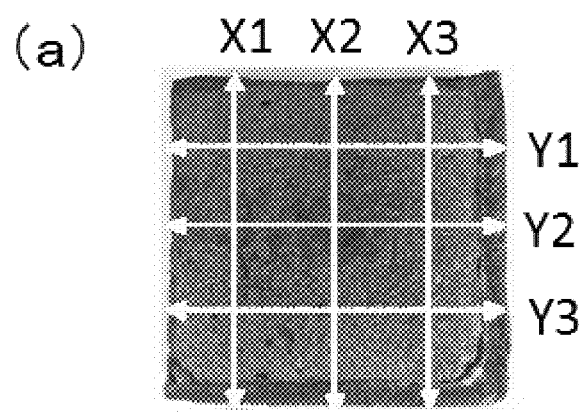
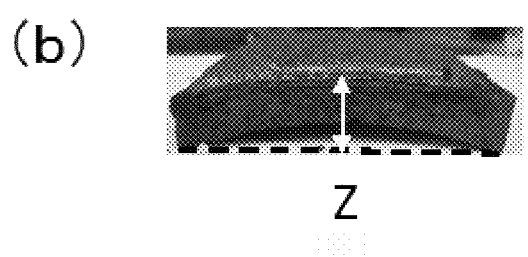

FLAME-RETARDANT URETHANE RESIN COMPOSITION

CROSS REFERENCE TO RELATED APPLICATION

This application claims priority to Japan Patent Application No. 2014-197047, filed on Sep. 26, 2014, the disclosure of which is incorporated herein by reference in its entirety.

TECHNICAL FIELD

The present invention relates to a flame-retardant urethane resin composition.

BACKGROUND ART

As a structural material for enhancing building strength, for example, concrete reinforced with rebars or the like has been used for the outer walls etc. of multi-dwelling units such as apartments, single-family homes, various school facilities, and commercial buildings.

Since concrete has heat-retention and cold-retention properties, there are disadvantages in that building interiors are warmed by heat retained in summer or are cooled as a result of cooling concrete in cold winter seasons. In order to reduce such long-term influence of outdoor temperature on building interiors through concrete, concrete is usually heat-insulated.

Accordingly, as a heat-insulating layer, a rigid polyurethane foam having flame retardancy against fire has been used.

Patent Literature (PTL) 1 discloses a flame-retardant urethane resin composition comprising a polyisocyanate compound, a polyol compound, a trimerization catalyst, a foaming agent, a foam stabilizer, and additives, wherein the trimerization catalyst is at least one member selected from the group consisting of nitrogen-containing aromatic compounds, carboxylic acid alkali metal salts, tertiary ammonium salts, and quaternary ammonium salts; and the additives are a combination of red phosphorus, which is essentially used as an additive, with at least one additive selected from the group consisting of phosphoric acid esters, phosphate-containing flame retardants, bromine-containing flame retardants, boron-containing flame retardants, antimony-containing flame retardants, and metal hydroxides.

CITATION LIST

Patent Literature

PTL 1: WO2014/112394

SUMMARY OF INVENTION

Technical Problem

The flame-retardant urethane resin composition disclosed in PTL 1 has been proved to have excellent flame retardancy and shape retention through an exothermic test performed using a molded article of the flame-retarding urethane resin composition cut to a size of length 10 cm×width 10 cm×thickness 5 cm.

However, when the molded article is made thin, heat permeates easily. Therefore, shrinkage and deformation of the molded article, in particular, deformation in the thickness direction, in the exothermic test were large. Accordingly, there was a problem such that shape retention sufficient for fire prevention, enabling the molded article to be used for purposes such as spraying and heat insulation panels, cannot be guaranteed.

An object of the present invention is to provide a flame-retardant urethane resin composition that has high flame retardancy and that, even at a low thickness, has excellent shape retention on heating.

Solution to Problem

According to the present invention, the following flame-retardant urethane resin compositions are provided.

Item 1. A flame-retardant urethane resin composition comprising a polyisocyanate compound, a polyol compound, a trimerization catalyst, a blowing agent, a foam stabilizer, an additive, and a filler, the additive comprising red phosphorus, and the filler having an aspect ratio of 5 to 50, an average particle diameter of 0.1 μm or larger, but smaller than 15 μm, and a melting point of 750° C. or higher.

Item 2. The flame-retardant urethane resin composition according to Item 1, wherein the filler has a weight loss ratio of 5% or less in an air atmosphere in TG/DTA measurement.

Item 3. The flame-retardant urethane resin composition according to Item 1 or 2, wherein the filler is an acicular inorganic filler.

Item 4. The flame-retardant urethane resin composition according to any one of Items 1 to 3, wherein the red phosphorus is present in an amount of 3.5 to 30 parts by weight and the filler is present in an amount of 3 to 30 parts by weight, based on 100 parts by weight of a urethane resin prepared from the polyisocyanate compound and the polyol compound.

Item 5. A molded article comprising the flame-retardant urethane resin composition according to any one of Items 1 to 4.

Item 6. The molded article according to Item 5, which has dimensions of more than 95 mm in each of the length and width directions and a deformation of less than 10 mm in the thickness direction after heating, in comparison with the dimensions before heating, as determined by heating the molded article with a size of 100 mm×100 mm×20 mm at a radiant heat intensity of 50 kW/m² for 20 minutes in accordance with the ISO-5660 test method.

Advantageous Effects of Invention

According to the present invention, there is provided a molded article comprising a flame-retardant urethane resin composition that, even at a low thickness, has excellent shape retention on heating.

BRIEF DESCRIPTION OF DRAWINGS

FIG. 1 is a diagram illustrating measurement points of shrinkage in each test sample. FIG. 1(a) shows the measurements in the X and Y directions. FIG. 1(b) shows the measurement in the Z direction.

DESCRIPTION OF EMBODIMENTS

The flame-retardant urethane resin composition according to the present invention is described.

First, the urethane resin used in the flame-retardant urethane resin composition is described.

The urethane resin is prepared from a polyisocyanate compound as a main component, and a polyol compound as a curing agent.

Examples of the polyisocyanate compound include aromatic polyisocyanates, alicyclic polyisocyanates, aliphatic polyisocyanates, and the like.

Examples of aromatic polyisocyanates include phenylene diisocyanate, tolylene diisocyanate, xylylene diisocyanate, diphenylmethane diisocyanate, dimethyl diphenylmethane diisocyanate, triphenylmethane triisocyanate, naphthalene diisocyanate, polymethylene polyphenyl polyisocyanates, and the like.

Examples of alicyclic polyisocyanates include cyclohexylene diisocyanate, methylcyclohexylene diisocyanate, isophorone diisocyanate, dicyclohexylmethane diisocyanate, dimethyldicyclohexylmethane diisocyanate, and the like.

Examples of aliphatic polyisocyanates include methylene diisocyanate, ethylene diisocyanate, propylene diisocyanate, tetramethylene diisocyanate, hexamethylene diisocyanate, and the like.

The polyisocyanate compounds may be used alone, or in a combination of two or more. The main component of urethane resin is preferably diphenylmethane diisocyanate because it is, for example, easy to use and readily available.

Examples of the polyol compound as a curing agent for urethane resin include polylactone polyols, polycarbonate polyols, aromatic polyols, alicyclic polyols, aliphatic polyols, polyester polyols, polymeric polyols, polyether polyols, and the like.

Examples of polylactone polyols include polypropiolactone glycol, polycaprolactone glycol, polyvalerolactone glycol, and the like.

Examples of polycarbonate polyols include polyols obtained by dealcoholization reaction of a hydroxyl-containing compound, such as ethylene glycol, propylene glycol, butanediol, pentanediol, hexanediol, octanediol, or nonanediol, with diethylene carbonate, dipropylene carbonate, or the like.

Examples of aromatic polyols include bisphenol A, bisphenol F, phenol novolac, cresol novolac, and the like.

Examples of alicyclic polyols include cyclohexane diol, methylcyclohexane diol, isophorone diol, dicyclohexylmethane diol, dimethyldicyclohexylmethane diol, and the like.

Examples of aliphatic polyols include ethylene glycol, propylene glycol, butanediol, pentanediol, hexanediol, and the like.

Examples of polyester polyols include polymers obtained by dehydration condensation of a polybasic acid with a polyhydric alcohol; polymers obtained by ring-opening polymerization of a lactone, such as ε-caprolactone or α-methyl-ε-caprolactone; and condensation products of hydroxy carboxylic acids with the polyhydric alcohols mentioned above or the like.

Specific examples of polybasic acids as used herein include adipic acid, azelaic acid, sebacic acid, terephthalic acid, isophthalic acid, succinic acid, and the like. Specific examples of polyhydric alcohols include bisphenol A, ethylene glycol, 1,2-propylene glycol, 1,4-butanediol, diethylene glycol, 1,6-hexane glycol, neopentyl glycol, and the like.

Specific examples of hydroxy carboxylic acids include castor oil; reaction products of castor oil with ethylene glycol; and the like.

Examples of polymeric polyols include polymers obtained by graft polymerization of aromatic polyols, alicyclic polyols, aliphatic polyols, polyester polyols, or the like with ethylenically unsaturated compounds, such as acrylonitrile, styrene, methyl acrylate, and methacrylate; polybutadiene polyol; modified polyols of polyhydric alcohols; hydrogenated products thereof; and the like.

Examples of modified polyols of polyhydric alcohols include those obtained by modifying a polyhydric alcohol used as a starting material by reacting the alcohol with an alkylene oxide.

Examples of polyhydric alcohols include trihydric alcohols such as glycerin and trimethylolpropane; tetra- to octahydric alcohols such as pentaerythritol, sorbitol, mannitol, sorbitan, diglycerol, dipentaerythritol, sucrose, glucose, mannose, fructose, methyl glucoside, and derivatives thereof; phenol polybutadiene polyols such as phenol, phloroglucin, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxyanthracene, and 1-hydroxypyrene; castor oil polyols; multi-functional polyols (e.g., 2 to 100 functional groups) such as (co)polymers of hydroxyalkyl(meth)acrylate and polyvinyl alcohols; and condensation products (novolak) of phenol with formaldehyde.

The method for modifying a polyhydric alcohol is not particularly limited. A method of adding alkylene oxide ("AO") to a polyhydric alcohol is preferably used.

Examples of AO include AO having 2 to 6 carbon atoms, such as ethylene oxide ("EO"), 1,2-propylene oxide ("PO"), 1,3-propylene oxide, 1,2-butylene oxide, and 1,4-butylene oxide.

Of these, PO, EO, and 1,2-butylene oxide are preferable, and PO and EO are more preferable, from the viewpoint of their characteristics and reactivity. When two or more types of AOs (e.g., PO and EO) are used, they may be added by block addition, random addition, or a combination thereof.

Examples of polyether polyols include polymers obtained by subjecting at least one member of alkylene oxides, such as ethylene oxide, propylene oxide, and tetrahydrofuran, to ring-opening polymerization in the presence of at least one member of, for example, low-molecular-weight active hydrogen compounds having two or more active hydrogen atoms.

Examples of low-molecular-weight active hydrogen compounds having two or more active hydrogen atoms include diols, such as bisphenol A, ethylene glycol, propylene glycol, butylene glycol, and 1,6-hexanediol; triols, such as glycerin and trimethylolpropane; amines, such as ethylenediamine and butylenediamine; and the like.

The polyol used in the present invention is preferably a polyester polyol or a polyether polyol because they greatly contribute to the reduction of the gross calorific value at the time of combustion.

Of these, it is more preferable to use a polyester polyol having a molecular weight of 200 to 800, and it is still more preferable to use a polyester polyol having a molecular weight of 300 to 500.

An isocyanate index is the percentage of the equivalent ratio of isocyanate groups in the polyisocyanate compound to hydroxyl groups in the polyol compound. A value exceeding 100 means that the amount of isocyanate groups is greater than the amount of hydroxyl groups.

The isocyanate index of the urethane resin used in the present invention is preferably in the range of 250 to 1000, more preferably 250 to 800, and even more preferably 300 to 700. The isocyanate index (INDEX) is calculated using the following equations.

INDEX=(number of equivalents of isocyanate)/
(number of equivalents of polyol+number of equivalents of water)×100

Number of equivalents of isocyanate=(number of parts of polyisocyanate added)×NCO content (%)/100/(molecular weight of NCO)

Number of equivalents of polyol=OHV×(number of parts of polyol added)/(molecular weight of KOH)

OHV is the hydroxyl value of polyol (mg KOH/g)

Number of equivalents of water=(number of parts of water added)/(number of OH groups in water)/(molecular weight of water)

In the above formulas, the parts are by weight (g), the NCO group has a molecular weight of 42, and the NCO content refers to the proportion (mass %) of NCO groups in the polyisocyanate compound. For the sake of unit conversion in the above formulas, the molecular weight of KOH is 56100, the molecular weight of water is 18, and the number of OH groups of water is 2.

The flame-retardant urethane resin composition contains a catalyst, a foaming agent, a foam stabilizer, an additive, and a filler.

Examples of catalysts include triethylamine, N-methylmorpholine, bis(2-dimethylaminoethyl) ether, N,N,N',N'',N''-pentamethyldiethylenetriamine, N,N,N'-trimethylaminoethylethanolamine, bis(2-dimethylaminoethyl) ether, N-methyl, N'-dimethylaminoethylpiperazine, an imidazole compound in which a secondary amine functional group in the imidazole ring is replaced with a cyanoethyl group, and the like.

The amount of catalyst used in the flame-retardant urethane composition is preferably within a range of 0.6 to 10 parts by weight, more preferably 0.6 to 8 parts by weight, still more preferably 0.6 to 6 parts by weight, and most preferably 0.6 to 3.0 parts by weight, based on 100 parts by weight of the urethane resin.

A range of 0.6 parts by weight or more does not inhibit the urethane bond formation, while a range of 10 parts by weight or less maintains an appropriate foaming rate, enabling easy handling.

Examples of preferable catalysts include trimerization catalysts that catalyze the reaction of isocyanate groups in the polyisocyanate compound as the main component of polyurethane resin to trimerize the isocyanate groups, leading to the formation of isocyanurate rings.

A trimerization catalyst catalyzes the reaction of isocyanate groups of a polyisocyanate compound as the main component of polyurethane resin to trimerize the isocyanate groups, leading to the formation of isocyanurate rings.

Examples of trimerization catalysts include nitrogen-containing aromatic compounds, such as tris(dimethylaminomethyl)phenol, 2,4-bis(dimethylaminomethyl)phenol, and 2,4,6-tris(dialkylaminoalkyl)hexahydro-S-triazine; carboxylic acid alkali metal salts such as potassium acetate and potassium 2-ethylhexanoate; tertiary ammonium salts, such as trimethyl ammonium salt, triethyl ammonium salt, and triphenyl ammonium salt; quaternary ammonium salts, such as tetramethyl ammonium salt, tetraethyl ammonium salt, and tetraphenyl ammonium salt; and the like.

The amount of the trimerization catalyst used in the flame-retardant urethane composition is preferably within a range of 0.6 to 10 parts by weight, more preferably 0.6 to 8 parts by weight, still more preferably 0.6 to 6 parts by weight, and most preferably 0.6 to 3.0 parts by weight, based on 100 parts by weight of the urethane resin. An amount of 0.6 parts by weight or more does not inhibit isocyanate trimerization, while an amount of 10 parts by weight or less maintains an appropriate foaming rate, enabling easy handling.

The foaming agent used in the flame-retardant urethane composition promotes the foaming of urethane resin.

Specific examples of foaming agents include water; low-boiling hydrocarbons, such as propane, butane, pentane, hexane, heptane, cyclopropane, cyclobutane, cyclopentane, cyclohexane, and cycloheptane; chlorinated aliphatic hydrocarbon compounds, such as dichloroethane, propylchloride, isopropylchloride, butylchloride, isobutylchloride, pentylchloride, and isopentylchloride; fluorine compounds such as $CHF_3$, $CH_2F_2$, and $CH_3F$; hydrochlorofluorocarbon compounds, such as trichloromonofluoromethane, trichlorotrifluoroethane, dichloromonofluoroethane (e.g., HCFC141b (1,1-dichloro-1-fluoroethane), HCFC22 (chlorodifluoromethane), and HCFC142b (1-chloro-1,1-difluoroethane)); hydrochlorofluorocarbon compounds, such as HFC-245fa (1,1,1,3,3-pentafluoropropane) and HFC-365mfc (1,1,1,3,3-pentafluorobutane); ether compounds, such as diisopropyl ether; organic physical foaming agents, such as mixtures of these compounds; inorganic physical foaming agents, such as nitrogen gas, oxygen gas, argon gas, and carbon dioxide gas; and the like.

The amount of the foaming agent is preferably within a range of 0.1 to 30 parts by weight, based on 100 parts by weight of the urethane resin. The amount of the foaming agent is more preferably within a range of 0.1 to 18 parts by weight, still more preferably 0.5 to 18 parts by weight, and most preferably 0.5 to 10 parts by weight, based on 100 parts by weight of the urethane resin.

When the range of the foaming agent is 0.1 parts by weight or more, air-foaming is promoted, and a good quality foam can be produced. When the range is 30 parts by weight or less, a large vaporization force prevents coarse air bubbles.

Examples of foam stabilizers used in the flame-retardant urethane resin composition include polyoxyalkylene foam stabilizers such as polyoxyalkylene alkyl ether; silicone foam stabilizers such as organopolysiloxane; and like surfactants.

The amount of the foam stabilizer used relative to the urethane resin cured by a chemical reaction is suitably set according to the type of urethane resin used. For example, the foam stabilizer is preferably used in an amount of 0.1 to 10 parts by weight, based on 100 parts by weight of the urethane resin.

The catalysts, foaming agents, and foam stabilizers may each be used alone, or in a combination of two or more.

Next, additives that can be used in the flame-retardant urethane resin composition of the present invention are described.

In the present invention, red phosphorus is essentially used as an additive. According to one embodiment of the present invention, the additives to be used include red phosphorus and a phosphoric acid ester.

The additive amount used in the present invention is preferably such that the total amount of additives other than urethane resin is within a range of 6 to 70 parts by weight, more preferably 6 to 40 parts by weight, still more preferably 6 to 30 parts by weight, and most preferably 6 to 20 parts by weight, based on 100 parts by weight of the urethane resin.

Using additives in an amount of 6 parts by weight or more prevents the breakage of dense residues that are formed by the heat of firing a molded product of the flame-retardant urethane resin composition. A range of 70 parts by weight or less does not inhibit the foaming of a flame-retardant urethane resin composition.

There is no limitation on the red phosphorus used in the present invention, and a commercially available product may be suitably selected for use.

The amount of the red phosphorus used in the flame-retardant urethane composition is preferably within a range of 3.5 to 30 parts by weight, more preferably 3.5 to 20 parts by weight, and still more preferably 6.0 to 18 parts by weight, based on 100 parts by weight of the urethane resin.

A red phosphorus range of 3.5 parts by weight or more maintains the self-extinguishing property of the flame-retardant urethane resin composition, while a range of 20 parts by weight or less does not inhibit the foaming of the flame-retardant urethane resin composition.

In one preferable embodiment of the present invention, red phosphorus is present in an amount of 2 to 18 wt. %, based on the weight of the flame-retardant urethane resin composition.

The phosphoric acid ester used in the present invention is not particularly limited. A monophosphoric acid ester, a condensed phosphoric acid ester, or the like is preferably used.

Examples of monophosphoric acid esters include, but are not particularly limited to, trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenyl phosphate, xylenyl diphenyl phosphate, diphenyl(2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresylphosphine oxide, diphenyl methanephosphonate, diethyl phenylphosphonate, resorcinol bis(diphenyl phosphate), bisphenol A bis(diphenyl phosphate), phospha phenanthrene, tris(R-chloropropyl)phosphate, and the like.

Examples of condensed phosphoric acid esters include, but are not particularly limited to, trialkyl polyphosphate, resorcinol polyphenyl phosphate, resorcinol poly(di-2,6-xylyl)phosphate (produced by Daihachi Chemical Industry Co., Ltd., trade name: PX-200), hydroquinone poly(2,6-xylyl)phosphate, condensation products thereof, and like condensed phosphoric acid esters.

Examples of commercially available condensed phosphoric acid esters include resorcinol polyphenyl phosphate (trade name: CR-733S), bisphenol A polycresyl phosphate (trade name: CR-741), aromatic condensed phosphoric acid ester (trade name: CR747), resorcinol polyphenyl phosphate (produced by Adeka Co. Ltd., trade name: ADK Stab PFR), bisphenol A polycresyl phosphate (trade names: FP-600 and FP-700), and the like.

Of the above, it is preferable to use a monophosphoric acid ester, and it is more preferable to use tris(3-chloropropyl) phosphate, because they reduce the viscosity of the composition before being cured, as well as the initial calorific value, in a highly sufficient manner.

The phosphoric acid esters may be used alone, or in a combination of two or more.

The amount of phosphoric acid ester used is preferably within a range of 2.5 to 50 parts by weight, more preferably 2.5 to 40 parts by weight, and still more preferably 2.5 to 30 parts by weight, based on 100 parts by weight of the urethane resin.

A phosphoric acid ester range of 2.5 parts by weight or more maintains the self-extinguishing property of the flame-retardant urethane resin composition, while a range of 50 parts by weight or less does not inhibit the foaming of the flame-retardant urethane resin composition.

The flame-retardant urethane composition may further contain an additive other than red phosphorus and phosphoric acid ester. For example, in place of or in addition to phosphoric acid ester, the flame-retardant urethane composition may contain at least one additive selected from the group consisting of phosphate-containing flame retardants, bromine-containing flame retardants, borate-containing flame retardants, antimony-containing flame retardants, and metal hydroxides.

Next, the filler used in the flame-retardant urethane resin composition of the present invention is described.

The filler prevents shrinkage and/or deformation. In this specification, "shrinkage" refers to changes in length, including length in the length direction, length in the width direction, and length in the thickness direction. "Deformation" refers to changes in shape, such as warping, in particular, configuration changes in the thickness direction.

The filler may be an organic filler or an inorganic filler. The filler is preferably an inorganic filler. The aspect ratio of the filler is 5 to 50, preferably 8 to 40, more preferably 10 to 40, even more preferably 10 to 35, and most preferably 8 to 25. The aspect ratio of the filler used in this specification refers to a ratio of the maximum length of the filler to the minimum thickness (in the direction perpendicular to the maximum length) (also referred to as diameter/thickness ratio), which is confirmed through images obtained by observing the filler under a scanning electron microscope. The average of a sufficient number of fillers, i.e., at least 250 fillers, is used.

The fillers have an average particle diameter of 0.1 $\mu$m or larger, but smaller than 15 $\mu$m, preferably 0.1 $\mu$m or more to 14 $\mu$m or less, and more preferably 0.3 to 10 $\mu$m. The average particle diameter can be determined by using an X-ray permeation-type sedimentation particle size distribution analyzer. The filler has a melting point of 750° C. or more, preferably 800° C. or more, and more preferably 1,000° C. or more.

The fillers may be acicular fillers or platy fillers, as long as the above aspect ratio, average particle diameter, and melting point are filled. The fillers are preferably acicular fillers.

Acicular means that the longest diameter is at least three times as long as the shortest diameter. Acicular fillers include so-called needle-shaped fillers, as well as spindle-shaped fillers, cylindrical fillers, and the like. Platy fillers include so-called plate-shaped fillers, as well as scaly fillers, lamellar fillers, and the like.

Examples of acicular inorganic fillers include basic magnesium sulfate, aluminum borate, wollastonite, xonotlite, dawsonite, ellestadite, boehmite, rod-shaped hydroxyapatite, potassium titanate whisker, aluminum borate whisker, magnesium whisker, silicon whisker, acicular alumina, acicular ceramic, asbestos, acicular calcium carbonate, gypsum fibers, glass fibers, asbestos fibers, silica fibers, alumina fibers, silica-alumina fibers, zirconia fibers, carbon fibers (including fibrous or acicular new carbons such as carbon nanotubes, and spherical new carbons such as fullerene), graphite fibers, boron nitride fibers, boron fibers, metal fibers, and the like.

Examples of platy inorganic fillers include scaly graphite; talc; micas such as muscovite and phlogopite, laminar clay minerals such as sericite, kaolinite, chlorite, montmorillonite, and halloysite; platy calcium carbonate, platy aluminum hydroxide, glass flakes, platy iron oxide, platy metal, and the like.

In one embodiment, the filler is an acicular inorganic filler having an aspect ratio of 5 to 50, and an average particle diameter of 0.1 µm or larger, but smaller than 15 µm. The filler is preferably wollastonite or a potassium titanate whisker.

The amount of the filler added is preferably in the range of 3 to 30 parts by weight, more preferably 3 to 25 parts by weight, even more preferably 3 to 18 parts by weight, based on 100 parts by weight of the urethane resin. In one embodiment of the present invention, the amount of the filler is 3 to 30 parts by weight per 6 to 80 parts by weight of the additive, preferably 3 to 25 parts by weight per 6 to 60 parts by weight of the additive, and more preferably 3 to 18 parts by weight, per 8.5 to 48 parts by weight of the additive.

The flame-retardant urethane resin composition of the present invention may contain, in addition to the above filler, one or more inorganic fillers.

As long as the object of the present invention is not impaired, the flame-retardant urethane composition may further contain an antioxidant, such as a phenol antioxidant, an amine antioxidant, or a sulfur antioxidant; a heat stabilizer, a metal deterioration inhibitor, an antistatic agent, a stabilizer, a crosslinking agent, a lubricant, a softening agent, a pigment, a tackifier resin, and like auxiliary components; and a polybutene, a petroleum resin, and like tackifiers.

Since the flame-retardant urethane resin composition is cured by a reaction, its viscosity changes over time. Accordingly, before use, the flame-retardant urethane resin composition is separated into two or more portions so as to prevent it from being cured by a reaction. At the time of use of the flame-retardant urethane resin composition, the two or more portions into which it has been separated are brought together. In this manner, the flame-retardant urethane resin composition is obtained.

The flame-retardant urethane resin composition may be separated into two or more portions in such a manner that the curing reaction will not start with a single-component portion of the flame-retardant urethane resin composition that is separated into two or more portions, but such that the curing reaction will start after all of the component portions of the flame-retardant urethane resin composition are mixed with each other.

In one embodiment, the flame-retardant urethane resin composition comprises, based on 100 parts by weight of a urethane resin prepared from the polyisocyanate compound and the polyol compound, 0.6 to 10 parts by weight of a trimerization catalyst, 0.1 to 30 parts by weight of a foaming agent, 0.1 to 10 parts by weight of a foam stabilizer, and 6 to 80 parts by weight of additives, wherein red phosphorus is present in an amount of 3.5 to 30 parts by weight, and a filler is present in an amount of 3 to 30 parts by weight.

The method for producing the flame-retardant urethane resin composition is not particularly limited. For example, the flame-retardant urethane resin composition is obtained by the following methods: a method comprising mixing each component of the flame-retardant urethane resin composition; a method comprising suspending the flame-retardant urethane resin composition in an organic solvent, or melting the flame-retardant urethane resin composition by heating, to obtain a flame-retardant urethane resin composition in the form of a coating composition; a method comprising preparing a slurry by dispersing in a solvent; and the like. Further, when the reactive curing resin components contained in the flame-retardant urethane resin composition include a component that is in a solid state at ordinary temperature (25° C.), it is also possible to use a method comprising melting the flame-retardant urethane resin composition with heating.

The flame-retardant urethane resin composition may be obtained by mixing and kneading each component of the flame-retardant urethane resin composition using a known apparatus, such as a single-screw extruder, a twin-screw extruder, a Banbury mixer, a kneader mixer, a kneading roll, a Raikai mixer, or a planetary stirrer.

Alternatively, the main component of the urethane resin and the curing agent may each be separately mixed and kneaded with a filler etc. in advance; immediately before being injected, each of the resulting mixtures may be mixed and kneaded by using a static mixer, a dynamic mixer, or the like to obtain a flame-retardant urethane resin composition.

It is also possible to obtain a flame-retardant urethane resin composition by, immediately before being injected, mixing and kneading a catalyst with the components of the flame-retardant urethane resin composition other than the catalyst in a manner similar to the above. The flame-retardant urethane resin composition can be obtained by any of the methods described above.

Next, the method for curing the flame-retardant urethane resin composition according to the present invention is described.

When the components of the flame-retardant urethane resin composition are mixed, a reaction starts and the viscosity increases over time, losing fluidity.

For example, the flame-retardant urethane resin composition may be injected into a container, such as a mold or frame, and cured to obtain a molded article of the flame-retardant urethane resin composition in the form of a foam. Alternatively, the flame-retardant urethane resin composition can be sprayed over a structure to be coated to obtain a molded article of the flame-retardant urethane resin composition in the form of a foam.

Heat or pressure may be applied to obtain a molded article of the flame-retardant urethane resin composition.

The thickness of the molded article of the present invention is not particularly limited. The thickness is, for example, 1 to 50 mm. In particular, a thickness of 20 mm or more is advantageous because a deformation-inhibiting effect is exerted in the exothermic test. In one embodiment of the present invention, the molded article of the present invention has dimensions of more than 95 mm in each of the length and width directions and a deformation of less than 10 mm in the thickness direction after heating, in comparison with the dimensions before heating, as determined by heating the molded article with a size of 100 mm×100 mm×20 mm (length direction×width direction×thickness direction) at a radiant heat intensity of 50 kW/m$^2$ for 20 minutes in accordance with the ISO-5660 test method.

The molded article of the flame-retardant urethane resin composition of the present invention preferably has a specific gravity of 0.020 to 0.130, more preferably 0.020 to 0.100, even more preferably 0.030 to 0.080, and most preferably 0.030 to 0.060.

The molded article comprising the flame-retardant urethane resin composition of the present invention preferably has a weight loss (1–sample weight after heating/sample weight before heating×100(%)) of 5% or less, as determined by raising the temperature from 30° C. to 900° C. at a rate of 10° C./min, and measuring TG/DTA in an air atmosphere at an air-stream flow rate of 100 mL/min. Thus, the molded article can fully retain its shape after heating.

Next, applications of the flame-retardant urethane resin composition according to the present invention are described.

The flame-retardant urethane resin composition can be formed into a thin panel and disposed in structures, such as buildings, furniture, automobiles, trains, and ships. Alternatively, the flame-retardant urethane resin composition can be sprayed over such structures to form a foam layer of the flame-retardant urethane resin composition on the surfaces thereof.

Next, a fire resistance test to test the fiber-reinforced resin molded article of the present invention is described below.

The molded article comprising the flame-retardant urethane resin composition is cut into a piece with a length of 100 mm, a width of 100 mm, and a thickness of 20 mm. In this manner, a sample for a cone calorimeter test is prepared.

Using the sample for a cone calorimeter test, and based on the test method of ISO-5660, a gross calorific value can be measured by a cone calorimeter test by heating the sample for 20 minutes at a radiant heat intensity of 50 kW/m$^2$ The present invention is described below in more detail with reference to Examples. However, the present invention is not limited to these Examples.

EXAMPLES

Example 1: Production of Foamed Molded Articles Comprising Flame-Retardant Urethane Resin Compositions and their Performance Evaluation 1. Production of Foamed Molded Articles Comprising Flame-Retardant Urethane Resin Compositions Following the formulations shown in Tables 1 and 2, the flame-retardant urethane resin compositions of Examples 1 to 20 and Comparative Examples 1 to 14 were prepared. The following are the details of each component in the tables.

1. Polyol Compound
(A-1) p-Phthalic acid polyester polyol (produced by Kawasaki Kasei Chemicals Ltd., product name: Maximol RFK-505, hydroxyl value=250 mg KOH/g)
(A-2) p-Phthalic acid polyester polyol (produced by Kawasaki Kasei Chemicals Ltd., product name: Maximol RFK-087, hydroxyl value=200 mg KOH/g)

2. Catalyst
(B-1) Trimerization catalyst (potassium octylate, produced by Momentive Performance Materials Inc., product name: K-Zero G)
(B-2) Trimerization catalyst (produced by Tosoh Corporation, product name: TOYOCAT-TR20)
(B-3) Urethanation catalyst (pentamethyldiethylenetriamine, produced by Tosoh Corporation, product name: TOYOCAT-DT)
(B-4) Trimerization catalyst (produced by Tosoh Corporation, product name: TOYOCAT-RX5)
(B-5) Urethanation catalyst (triethylenediamine, produced by Tosoh Corporation, product name: TEDA-L33)
(B-6) Urethanation catalyst (1,2-dimethylimidazole, produced by Tosoh Corporation, product name: TOYOCAT-DM70)

3. Foam Stabilizer
Polyalkylene glycol-based foam stabilizer (produced by Dow Corning Toray Co., Ltd., product name: SH-193)

4. Foaming Agent
(C-1) Pure water
(C-2) HFC HFC-365mfc (1,1,1,3,3-pentafluorobutane, produced by Solvay Japan, Ltd.) and HFC-245fa (1,1,1,3,3-pentafluoropropane, produced by Central Glass Co., Ltd.), mixed ratio: HFC-365mfc:HFC-245fa=7:3, hereinafter referred to as "HFC")

5. Isocyanate Compound (Hereinafter Referred to as "Polyisocyanate")
MDI (produced by Tosoh Corporation, product name: Millionate MR-200), viscosity: 167 mPa·s, NCO content=32.1%

6. Additives
(D-1) Red phosphorus (produced by Rin Kagaku Kogyo Co., Ltd., product name: Nova Excel 140)
(D-2) Tris(3-chloropropyl) phosphate (produced by Daihachi Chemical Industry Co., Ltd., product name: TMCPP, hereinafter referred to as "TMCPP")
(D-3) Bromine-containing flame retardant (produced by Manac Incorporated, product name: HBB-b, hereinafter referred to as "HBB")
(D-4) Ammonium dihydrogen phosphate (produced by Taihei Chemical Industrial Co., Ltd.)

7. Filler
(E-1) Wollastonite ($SiO_2$, CaO) (produced by Kinsei Matec Co., Ltd., product name: SH-1250), aspect ratio 10 to 16, average particle diameter: 4.5 to 6.5 μm
(E-2) Wollastonite ($SiO_2$, CaO) (produced by Kinsei Matec Co., Ltd., product name: SH-800), aspect ratio: 15 to 20, average particle diameter: 6 to 9 μm
(E-3) Wollastonite ($SiO_2$, CaO) (produced by Kinsei Matec Co., Ltd., product name: SH-600), aspect ratio: 12 to 18, average particle diameter: 9.5 to 13 μm
(E-4) Wollastonite ($SiO_2$, CaO) (produced by Kinsei Matec Co., Ltd., product name: SH-400), aspect ratio: 12 to 18, average particle diameter: 15 to 25 μm
(E-5) Wollastonite ($SiO_2$, CaO) (produced by Kinsei Matec Co., Ltd., product name: FRW-800), aspect ratio: 2 to 4, average particle diameter: 3.5 to 4.5 μm
(E-6) Potassium titanate whisker ($K_2O_n TiO_2$) (produced by Otsuka Chemical Co., Ltd., product name: Tismo D), aspect ratio: 17 to 33, average particle diameter: 0.3 to 0.6 μm,
(E-7) Potassium titanate whisker ($K_2O_n TiO_2$) (produced by Otsuka Chemical Co., Ltd., product name: Terracess TF-S), average particle diameter: 3 to 11 μm
(E-8) Potassium titanate whisker ($K_2O_n TiO_2$) (produced by Otsuka Chemical Co., Ltd., Terracess JP), average particle diameter: 6 to 13 μm
(E-9) Alumina ($Al_2O_3/H_2O$) (produced by Kawai Lime Industry Co., Ltd., product name: Celasule BMI), aspect ratio: 30 to 50, average particle diameter: 4 to 6 μm
(E-10) Alumina ($Al_2O_3/H_2O$) (produced by Kawai Lime Industry Co., Ltd., Celasule BMF), aspect ratio: 40 to 50, average particle diameter: 3 to 5 μm
(E-11) Alumina ($Al_2O_3/H_2O$) (produced by Kawai Lime Industry Co., Ltd., Celasule BMM), aspect ratio: 10, average particle diameter: 0.8 to 1 μm Following the formulations shown in Tables 1 and 2, the polyisocyanate compound and components other than the HFC component, i.e., the polyol compound, foam stabilizer, various catalysts, foaming agent, additives, and filler, were weighed into a 1000-mL polypropylene beaker and stirred at 25° C. for 10 seconds using a handheld electric mixer. The polyisocyanate compound and HFC component were added to the stirred kneaded product. The resulting mixture was stirred using a handheld electric mixer for 10 seconds to obtain a foam. The obtained flame-retardant urethane composition lost fluidity with the progress of time. In this manner, a foamed molded article of each of the flame-retardant urethane resin compositions of Examples 1 to 20 and Comparative Examples 1 to 14 was obtained.

2. Evaluation of Molded Articles

Measurement of Gross Calorific Value

Each cured product was cut to a size of 100 mm×100 mm×20 mm (length direction×width direction×thickness direction) to obtain a sample for a cone calorimeter test. The obtained sample was heated at a radiant heat intensity of 50 kW/m$^2$ for 20 minutes in accordance with ISO-5660. Tables 1 and 2 show the results.

Measurement of Density

Each cured product was cut to a size of 100 mm×100 mm×20 mm (length direction×width direction×thickness direction) to prepare a cone calorimeter test sample. The dimension of each sample was measured using a Vernier caliper, and the mass of each sample was measured using an electronic balance to determine the density. Tables 1 and 2 show the results.

The gross calorific value as determined by heating for 20 minutes and using a cone calorimeter was less than 8 MJ/m$^2$ in all of Examples 1 to 19. Thus, the molded articles of the present invention exhibited excellent flame retardancy. In the Comparative Examples, for example, Comparative Examples 3 to 5, the gross calorific value as determined by heating for 20 minutes and using a cone calorimeter was more than 8 MJ/m$^2$.

Measurement of Shrinkage

The amount of shrinkage and amount of deformation (mm) on heating in the cone calorimeter test were measured. As shown in FIG. 1($a$), X is the length direction and Y is the width direction. As shown in FIG. 1($b$), Z is the thickness direction. Each test sample was measured at three points in each of the X and Y directions, and measured at the most-shrunk portion in the Z direction. The numerical value at the most-shrunk portion was used as a value in each direction. When the length of the molded article was more than 95 mm in both of the length and width directions, the sample was evaluated as Pass. When the length of the molded article was less than 95 mm in at least one of the length and width directions, the sample was evaluated as Fail. When the deformation in the thickness direction was less than 10 mm, the sample was evaluated as Pass. When the deformation in the thickness direction was 10 mm or more, the sample was evaluated as Fail. In the assessment, an "A" was given when the sample received a Pass evaluation in all of the X, Y, and Z directions; a "B" was given when the sample received a Fail evaluation in at least one of the X, Y, and Z directions. Tables 1 and 2 show the results.

All of the molded articles obtained in Examples 1 to 20 had little deformation, and exerted deformation-inhibiting effects.

TABLE 1

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Polyol compound | A-1 | RFK-505 | 31.8 | 21.1 | 21.8 | 21.8 | 21.8 | 10.9 |  | 21.8 | 21.8 | 21.8 |
|  | A-2 | RLK-087 |  |  |  |  |  | 12.7 | 25.2 |  |  |  |
| Catalyst | B-1 | K-zero | 0.5 | 0.5 | 0.5 | 0.5 | 0.5 | 0.5 | 0.5 | 0.5 | 0.5 | 0.5 |
|  | B-2 | TR20 | 0.7 | 0.7 | 0.7 | 0.7 | 0.7 | 0.7 | 0.7 | 0.7 | 0.7 | 0.7 |
|  | B-3 | DT | 0.1 | 0.1 | 0.1 | 0.1 | 0.1 | 0.1 | 0.1 | 0.1 | 0.1 | 0.1 |
|  | B-4 | RX5 |  |  |  |  |  |  |  |  |  |  |
|  | B-5 | L33 |  |  |  |  |  |  |  |  |  |  |
|  | B-6 | DM70 |  |  |  |  |  |  |  |  |  |  |
| Foam stabilizer | SH-193 |  | 1.7 | 1.7 | 1.7 | 1.7 | 1.7 | 1.7 | 1.7 | 1.7 | 1.7 | 1.7 |
| Foaming agent | C-1 | Water | 0.6 | 0.6 | 0.6 | 0.6 | 0.6 | 0.6 | 0.6 | 0.6 | 0.6 | 0.6 |
|  | C-2 | HFC | 4.6 | 4.6 | 4.6 | 4.6 | 4.6 | 4.6 | 4.6 | 4.6 | 4.6 | 4.6 |
| Isocyanate | MR-200 |  | 68.2 | 78.9 | 78.2 | 78.2 | 78.2 | 76.4 | 74.8 | 78.2 | 78.2 | 78.2 |
| Additive | D-1 | Red phosphorus | 9 | 6 | 9 | 9 | 18 | 9 | 9 | 9 | 9 | 9 |
|  | D-2 | Phosphoric acid ester | 7 | 7 | 30 | 30 | 7 | 7 | 7 | 7 | 7 | 7 |
| Filler | E-1 | SH-1250 | 9 | 9 | 9 | 18 | 9 | 9 | 9 | 6 | 3 |  |
|  | E-2 | SH-800 |  |  |  |  |  |  |  |  |  | 9 |
|  | E-3 | SH-600 |  |  |  |  |  |  |  |  |  |  |
|  | E-4 | SH-400 |  |  |  |  |  |  |  |  |  |  |
|  | E-5 | FRW-800 |  |  |  |  |  |  |  |  |  |  |
|  | E-6 | Tismo D |  |  |  |  |  |  |  |  |  |  |
|  | E-7 | Terracess TF-S |  |  |  |  |  |  |  |  |  |  |
|  | E-8 | Terracess JP |  |  |  |  |  |  |  |  |  |  |
|  | E-9 | BMI |  |  |  |  |  |  |  |  |  |  |
|  | E-10 | BMF |  |  |  |  |  |  |  |  |  |  |
|  | E-11 | BMM |  |  |  |  |  |  |  |  |  |  |
| Evaluation items | INDEX |  | 250 | 365 | 365 | 365 | 365 | 365 | 365 | 365 | 365 | 365 |
|  | Gross calorific value (MJ/m$^2$) |  | 4.6 | 4.8 | 6.6 | 5.7 | 4.1 | 5.3 | 5.5 | 5.5 | 4.8 | 4.2 |
|  | Density (Kg/m$^3$) |  | 48 | 50 | 58 | 58 | 56 | 50 | 48 | 50 | 49 | 52 |
|  | Most-shrunk numerical value | X | 100.2 | 98.2 | 99.5 | 98.1 | 98.3 | 100.9 | 102.9 | 98.0 | 98.8 | 98.5 |
|  |  | Y | 101.6 | 98.6 | 98.7 | 99.2 | 98.1 | 100.4 | 101.7 | 97.3 | 98.3 | 98.8 |
|  |  | Z | 29.6 | 28.0 | 25.7 | 22.8 | 27.6 | 25.8 | 25.9 | 28.9 | 27.6 | 27.1 |
|  |  | Evaluation | A | A | A | A | A | A | A | A | A | A |

|  |  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Polyol compound | A-1 | RFK-505 | 21.8 | 21.8 | 21.8 | 21.8 | 21.8 | 21.8 | 21.8 | 21.8 |  | 21.8 |
|  | A-2 | RLK-087 |  |  |  |  |  |  |  |  | 25.2 |  |

TABLE 1-continued

| Category | Code | Name | C1 | C2 | C3 | C4 | C5 | C6 | C7 | C8 | C9 | C10 |
|---|---|---|---|---|---|---|---|---|---|---|---|---|
| Catalyst | B-1 | K-zero | 0.5 | 0.5 | 0.5 | 0.5 | 0.5 | 0.5 | 0.5 | 0.5 | | 0.5 |
| | B-2 | TR20 | 0.7 | 0.7 | 0.7 | 0.7 | 0.7 | 0.7 | 0.7 | 0.7 | | 0.7 |
| | B-3 | DT | 0.1 | 0.1 | 0.1 | 0.1 | 0.1 | 0.1 | 0.1 | 0.1 | | 0.1 |
| | B-4 | RX5 | | | | | | | | | 0.7 | |
| | B-5 | L33 | | | | | | | | | 0.9 | |
| | B-6 | DM70 | | | | | | | | | 0.9 | |
| Foam stabilizer | | SH-193 | 1.7 | 1.7 | 1.7 | 1.7 | 1.7 | 1.7 | 1.7 | 1.7 | 1.7 | 1.7 |
| Foaming agent | C-1 | Water | 0.6 | 0.6 | 0.6 | 0.6 | 0.6 | 0.6 | 0.6 | 0.6 | 0.6 | 0.6 |
| | C-2 | HFC | 4.6 | 4.6 | 4.6 | 4.6 | 4.6 | 4.6 | 4.6 | 4.6 | 4.6 | 4.6 |
| Isocyanate | | MR-200 | 78.2 | 78.2 | 78.2 | 78.2 | 78.2 | 78.2 | 78.2 | 78.2 | 74.8 | 78.2 |
| Additive | D-1 | Red phosphorus | 9 | 9 | 9 | 9 | 9 | 9 | 9 | 9 | 9 | 3 |
| | D-2 | Phosphoric acid ester | 7 | 7 | 7 | 7 | 7 | 7 | 7 | 7 | 7 | 2.3 |
| Filler | E-1 | SH-1250 | | | | | | | | | 9 | 3 |
| | E-2 | SH-800 | 6 | 3 | | | | | | | | |
| | E-3 | SH-600 | | | 9 | 6 | 3 | | | | | |
| | E-4 | SH-400 | | | | | | | | | | |
| | E-5 | FRW-800 | | | | | | | | | | |
| | E-6 | Tismo D | | | | | | 9 | 6 | 3 | | |
| | E-7 | Terracess TF-S | | | | | | | | | | |
| | E-8 | Terracess JP | | | | | | | | | | |
| | E-9 | BMI | | | | | | | | | | |
| | E-10 | BMF | | | | | | | | | | |
| | E-11 | BMM | | | | | | | | | | |
| Evaluation items | | INDEX | 365 | 365 | 365 | 365 | 365 | 365 | 365 | 365 | 365 | 365 |
| | | Gross calorific value (MJ/m$^2$) | 4.5 | 4.3 | 6.6 | 4.5 | 4.5 | 4.2 | 4.5 | 4.7 | 4.7 | 9.0 |
| | | Density (Kg/m$^3$) | 51 | 48 | 52 | 49 | 49 | 50 | 48 | 47 | 41 | 49 |
| | Most-shrunk numerical value | X | 98.4 | 99.7 | 97.1 | 99.2 | 99.2 | 99.3 | 100.5 | 100.3 | 98.7 | 96.9 |
| | | Y | 98.7 | 100.1 | 96.8 | 99.4 | 98.7 | 98.4 | 101.4 | 100.6 | 99.4 | 97.0 |
| | | Z | 28.4 | 28.4 | 28.1 | 28.3 | 29.2 | 25.4 | 27.3 | 29.3 | 28.9 | 26.7 |
| | | Evaluation | A | A | A | A | A | A | A | A | A | A |

TABLE 2

| Category | Code | Name | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Polyol compound | A-1 | RFK-505 | 21.8 | 21.8 | 21.8 | 57 | 48.6 | 21.8 | 21.8 |
| | A-2 | RLK-087 | | | | | | | |
| Catalyst | B-1 | K-zero | 0.5 | 0.5 | 0.5 | 0.5 | 0.5 | 0.5 | 0.5 |
| | B-2 | TR20 | 0.7 | 0.7 | 0.7 | 0.7 | 0.7 | 0.7 | 0.7 |
| | B-3 | DT | 0.1 | 0.1 | 0.1 | 0.1 | 0.1 | 0.1 | 0.1 |
| Foam stabilizer | | SH-193 | 1.7 | 1.7 | 1.7 | 1.7 | 1.7 | 1.7 | 1.7 |
| Foaming agent | C-1 | Water | 0.6 | 0.6 | 0.6 | 0.6 | 0.6 | 0.6 | 0.6 |
| | C-2 | HFC | 4.6 | 4.6 | 4.6 | 4.6 | 4.6 | 4.6 | 4.6 |
| Isocyanate | | MR-200 | 78.2 | 78.2 | 78.2 | 43 | 51.4 | 78.2 | 78.2 |
| Additive | D-1 | Red phosphorus | | 6 | 9 | 9 | 9 | 9 | 9 |
| | D-2 | Phosphoric acid ester | | 7 | 7 | 7 | 7 | 7 | 7 |
| | D-3 | HBB | | | 3 | | | | |
| | D-4 | Phosphate | | | 3 | | | | |
| Filler | E-1 | SH-1250 | | | | 9 | 9 | | |
| | E-2 | SH-800 | | | | | | | |
| | E-3 | SH-600 | | | | | | | |
| | E-4 | SH-400 | | | | | | 9 | 3 |
| | E-5 | FRW-800 | | | | | | | |
| | E-6 | Tismo D | | | | | | | |
| | E-7 | Terracess TF-S | | | | | | | |
| | E-8 | Terracess JP | | | | | | | |
| | E-9 | BMI | | | | | | | |
| | E-10 | BMF | | | | | | | |
| | E-11 | BMM | | | | | | | |
| Evaluation items | | INDEX | 365 | 365 | 365 | 150 | 200 | 365 | 365 |
| | | Gross calorific value (MJ/m$^2$) | 50.3 | 4.2 | 8.5 | 11.5 | 9.0 | 4.7 | 5.2 |
| | | Density (kg/m$^3$) | 47 | 50 | 53 | 45 | 45 | 52 | 49 |
| | Most-shrunk numerical value (mm) | X | Un-measurable | 93.8 | 94.4 | Un-measurable | Un-measurable | 94.5 | 95.0 |
| | | Y | | 93.0 | 95.1 | | | 94.6 | 95.2 |
| | | Z | | 30.1 | 30.2 | | | 31.5 | 31.6 |
| | | Evaluation | B | B | B | B | B | B | B |

TABLE 2-continued

| | | | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Polyol compound | A-1 | RFK-505 | 21.8 | 21.8 | 21.8 | 21.8 | 21.8 | 21.8 | 21.8 |
| | A-2 | RLK-087 | | | | | | | |
| Catalyst | B-1 | K-zero | 0.5 | 0.5 | 0.5 | 0.5 | 0.5 | 0.5 | 0.5 |
| | B-2 | TR20 | 0.7 | 0.7 | 0.7 | 0.7 | 0.7 | 0.7 | 0.7 |
| | B-3 | DT | 0.1 | 0.1 | 0.1 | 0.1 | 0.1 | 0.1 | 0.1 |
| Foam stabilizer | | SH-193 | 1.7 | 1.7 | 1.7 | 1.7 | 1.7 | 1.7 | 1.7 |
| Foaming agent | C-1 | Water | 0.6 | 0.6 | 0.6 | 0.6 | 0.6 | 0.6 | 0.6 |
| | C-2 | HFC | 4.6 | 4.6 | 4.6 | 4.6 | 4.6 | 4.6 | 4.6 |
| Isocyanate | | MR-200 | 78.2 | 78.2 | 78.2 | 78.2 | 78.2 | 78.2 | 78.2 |
| Additive | D-1 | Red phosphorus | 9 | 9 | 9 | 9 | 9 | 9 | 9 |
| | D-2 | Phosphoric acid ester | 7 | 7 | 7 | 7 | 7 | 7 | 7 |
| | D-3 | HBB | | | | | | | |
| | D-4 | Phosphate | | | | | | | |
| Filler | E-1 | SH-1250 | | | | | | | |
| | E-2 | SH-800 | | | | | | | |
| | E-3 | SH-600 | | | | | | | |
| | E-4 | SH-400 | | | | | | | |
| | E-5 | FRW-800 | 9 | 3 | | | | | |
| | E-6 | Tismo D | | | | | | | |
| | E-7 | Terracess TF-S | | | 9 | | | | |
| | E-8 | Terracess JP | | | | 9 | | | |
| | E-9 | BMI | | | | | 9 | | |
| | E-10 | BMF | | | | | | 9 | |
| | E-11 | BMM | | | | | | | 9 |
| Evaluation items | INDEX | | 365 | 365 | 365 | 365 | 365 | 365 | 365 |
| | Gross calorific value (MJ/m$^2$) | | 4.5 | 3.5 | 4.8 | 4.1 | 4.6 | 4.2 | 4.7 |
| | Density (kg/m$^3$) | | 48 | 52 | 47 | 47 | 46 | 46 | 46 |
| | Most-shrunk numerical value (mm) | X | 94.0 | 93.6 | 93.4 | 94.6 | 94.2 | 93.8 | 94.4 |
| | | Y | 94.9 | 94.3 | 93.7 | 94.3 | 93.3 | 93.3 | 93.4 |
| | | Z | 30.4 | 29.3 | 31.4 | 30.9 | 29.4 | 29.7 | 28.4 |
| | | Evaluation | B | B | B | B | B | B | B |

Example 2: Evaluation of Influence of Various Fillers on Shrinkage of Foamed Molded Articles Each foamed molded article was produced using the same materials and formulations as in Example 1 except that the amount of each filler used in Example 1 was changed to 3 parts by weight, 6 parts by weight, or 9 parts by weight, based on 100 parts by weight of urethane resin. The particle diameter of the filler was measured using an X-ray penetration-type sedimentation particle size distribution analyzer, and the aspect ratio was determined.

Each test sample with a size of 100 mm×100 mm×20 mm was prepared in the same manner as in Example 1, and subjected to a cone calorimeter test. The amount of shrinkage after the combustion test was measured. In the assessment, an "A" was given when the sample passed in all of the X, Y and Z directions. A "B" was given when the sample failed in at least one of the X, Y, and Z directions. Tables 1 and 2 show the results.

Each filler sample was taken in a sample amount of 10 mg. While the temperature was raised from 30° C. to 900° C. at a rate of 10° C./min, the weight was measured using a TG/DTA measuring apparatus (TG/DTA7300, produced by Hitachi Ltd.) in an air atmosphere at an air-flow rate of 100 mL/min. The residual amount of the sample was determined according to the following formula: (sample weight after heating/sample weight before heating)×100(%).

The results of Table 3 show that when the filler has an aspect ratio of 5 to 50, an average particle diameter of 0.1 μm or larger but not smaller than 15 μm, and a melting point higher than the heating temperature, little shrinkage occurs in the foamed molded article, regardless of the amount of filler added. Such fillers had a weight loss of 5% or less in an air atmosphere in TG/DTA measurement.

TABLE 3

| | Material | | | | | |
|---|---|---|---|---|---|---|
| | Wollastonite (SiO$_2$ · CaO) | | | | | Alumina (Al$_2$O$_3$ · H$_2$O) |
| Grade name | SH-400 | SH-600 | SH-800 | SH-1250 | FRW-800 | BMI |
| Shape | Needle | Needle | Needle | Needle | Needle | Needle |
| Particle diameter (μm) | 15 to 25 | 9.5 to 13 | 6 to 9 | 4.5 to 6.5 | 3.5 to 4.5 | 4 to 6 |
| Aspect ratio | 12 to 18 | 12 to 18 | 15 to 20 | 10 to 16 | 2 to 4 | 30 to 50 |
| Melting point | 1,400 | 1,400 | 1,400 | 1,400 | 1,400 | 450 to 500 |

TABLE 3-continued

| Amount added | 9 parts | B | A | A | A | B | B |
|---|---|---|---|---|---|---|---|
| | 6 parts | B | A | A | A | B | B |
| | 3 parts | B | A | A | A | B | B |
| Residual amount of the filler (%) | | 98.4 | 98.5 | 98.0 | 96.1 | 98.4 | 80.3 |

| | | Material | | | | |
|---|---|---|---|---|---|---|
| | | | | Potassium titanate ($K_2O_nT_1O_2$) | | |
| | | Alumina ($Al_2O_3 \cdot H_2O$) | | Tismo | Terracess | Terracess |
| Grade name | | BMF | BMM | D | TF-S | JP |
| Shape | | Scaly | Lamellar | Needle | Lamellar | Amoeba |
| Particle diameter (μm) | | 3 to 5 | 0.8 to 1 | 0.3 to 0.6 | 3 to 11 | 6 to 13 |
| Aspect ratio | | 40 to 50 | 10 | 17 to 33 | — | — |
| Melting point | | 500 to 530 | 490 to 520 | 1,300 | 1,300 | 1,300 |
| Amount added | 9 parts | B | B | A | B | B |
| | 6 parts | B | B | A | B | B |
| | 3 parts | B | B | A | B | B |
| Residual amount of the filler (%) | | 81.6 | 82.6 | — | — | — |

\* A: Little shrinkage
B: Large shrinkage
—: Not measured

The invention claimed is:

1. A composition for preparing a flame-retardant urethane resin composition comprising a polyisocyanate compound, a polyol compound, a trimerization catalyst, a blowing agent, a foam stabilizer, red phosphorous, a phosphoric acid ester, and a filler, wherein
the filler has an aspect ratio of 5 to 50, an average particle diameter of 0.1 μm to less than 15 μm, and a melting point of 750° C. or higher,
the filler is selected from the group consisting of wollastonite and potassium titanate whisker,
the flame-retardant urethane resin composition comprises, based on 100 parts by weight of a urethane resin prepared from the polyisocyanate compound and the polyol compound,
0.6 to 6 parts by weight of the trimerization catalyst,
0.5 to 18 parts by weight of the blowing agent,
0.1 to 10 parts by weight of the foam stabilizer,
3.5 to 18 parts by weight of the red phosphorous,
2.5 to 30 parts by weight of the phosphoric acid ester, and
3 to 30 parts by weight of the filler, and
wherein the isocyanate index of the urethane resin is in the range from 365 to 1000.

2. The composition according to claim 1, wherein the filler has a weight loss of 5% or less in an air atmosphere as measured using thermogravimetry and differential thermal analysis (TG/DTA).

3. A molded article comprising the composition according to claim 1.

4. The molded article according to claim 3, wherein the molded article has dimensions of 100 mm in length, 100 mm in width and 20 mm in thickness before a heating step, and wherein the molded article maintains dimensions of more than 95 mm in length and 95 mm in width and has a deformation of less than 10 mm in the thickness direction after heating at a radiant heat intensity of 50 kW/m² for 20 minutes in accordance with the ISO-5660 test method.

5. The composition of claim 1, wherein the gross calorific value measured with heating a sample of the composition, after it is cured, at a radiant heat intensity of 50 kW/m² for 20 minutes for a cone calorimeter test based on ISO-5660 is not more than 8 MJ/m².

6. A composition for preparing a flame-retardant urethane resin composition comprising a polyisocyanate compound, a polyol compound, a trimerization catalyst, a blowing agent, a foam stabilizer, red phosphorous, a phosphoric acid ester, and a filler, wherein
the filler has an aspect ratio of 5 to 50, an average particle diameter of 0.1 μm to less than 15 μm, and a melting point of 750° C. or higher,
the filler comprises an acicular inorganic filler or a platy inorganic filler,
the acicular inorganic filler is selected from the group consisting of basic magnesium sulfate, aluminum borate, wollastonite, xonotlite, dawsonite, ellestadite, rod-shaped hydroxyapatite, potassium titanate whisker, aluminum borate whisker, magnesium whisker, silicon whisker, acicular alumina, acicular ceramic, asbestos, acicular calcium carbonate, gypsum fibers, glass fibers, asbestos fibers, silica fibers, silica-alumina fibers, zirconia fibers, graphite fibers, boron nitride fibers, boron fibers, and metal fibers; and the platy inorganic filler is selected from the group consisting of scaly graphite, talc, micas, laminar clay minerals, platy calcium carbonate, platy aluminum hydroxide, glass flakes, platy iron oxide, and platy metal,
the flame-retardant urethane resin composition comprises, based on 100 parts by weight of a urethane resin prepared from the polyisocyanate compound and the polyol compound,
1.2 to 3 parts by weight of the trimerization catalyst,
0.5 to 5.2 parts by weight of the blowing agent,
1.7 to 10 parts by weight of the foam stabilizer,
6 to 18 parts by weight of the red phosphorous,
7 to 30 parts by weight of the phosphoric acid ester, and
3 to 18 parts by weight of the filler, and
wherein the isocyanate index of the urethane resin is in the range from 365 to 1000.

7. A composition for preparing a flame-retardant urethane resin composition comprising a polyisocyanate compound, a polyol compound, a trimerization catalyst, a blowing agent, a foam stabilizer, red phosphorous, a phosphoric acid ester, and a filler, wherein
the filler has an aspect ratio of 5 to 50, an average particle diameter of 0.1 μm to less than 15 μm, and a melting point of 750° C. or higher, the filler comprises an acicular inorganic filler or a platy inorganic filler, the acicular inorganic filler is selected from the group consisting of basic magnesium sulfate, aluminum borate, wollastonite, xonotlite, dawsonite, ellestadite, rod-shaped hydroxyapatite, potassium titanate whisker, aluminum borate whisker, magnesium whisker, silicon whisker, acicular alumina, acicular ceramic, asbestos, acicular calcium carbonate, gypsum fibers, glass fibers, asbestos fibers, silica fibers, silica-alumina fibers, zirconia fibers, graphite fibers, boron nitride fibers, boron fibers, and metal fibers; and the platy inorganic filler is selected from the group consisting of scaly graphite, talc, micas, laminar clay minerals, platy calcium carbonate, platy aluminum hydroxide, glass flakes, platy iron oxide, and platy metal, the flame-retardant urethane resin composition comprises, based on 100 parts by weight of a urethane resin prepared from the polyisocyanate compound and the polyol compound, 1.2 parts by weight of the trimerization catalyst, 5.2 parts by weight of the blowing agent, 1.7 parts by weight of the foam stabilizer, 6 to 18 parts by weight of the red phosphorous, 7 to 30 parts by weight of the phosphoric acid ester, and 3 to 18 parts by weight of the filler, and wherein the isocyanate index of the urethane resin is in the range from 365 to 1000.

\* \* \* \* \*